O. C. MOORE.
ENGINE FEED WATER REGULATOR.
APPLICATION FILED MAR. 26, 1912.
1,050,745.
Patented Jan. 14, 1913.
3 SHEETS—SHEET 3.
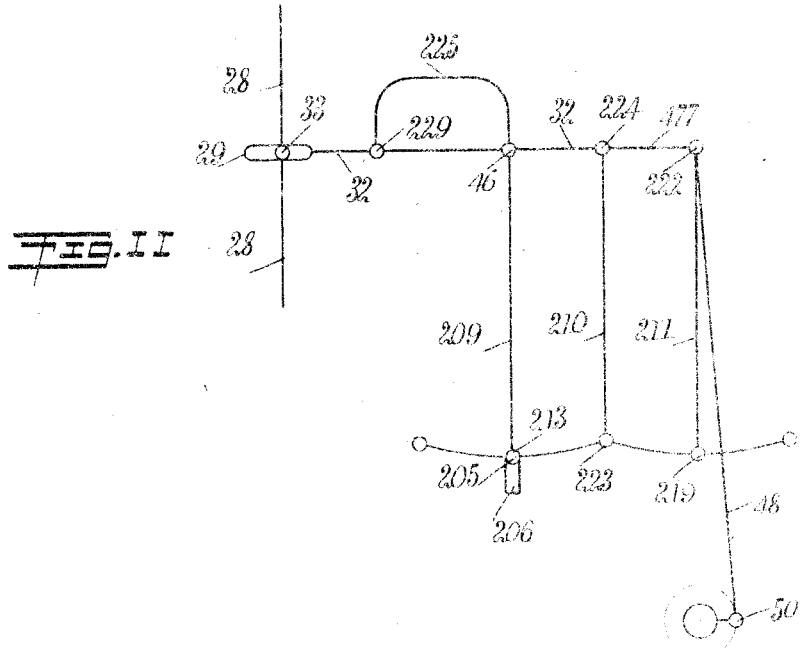
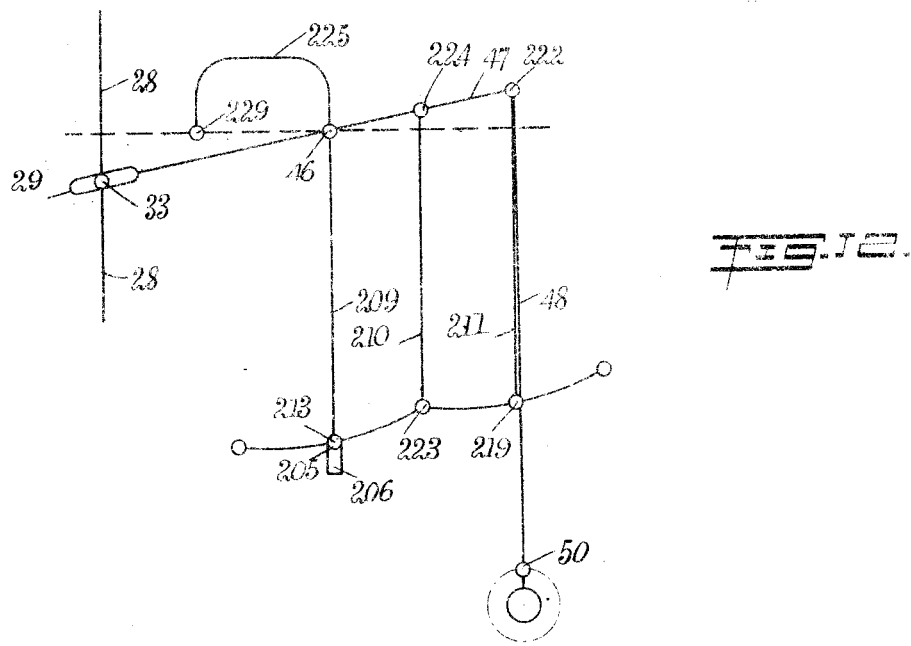
WITNESSES
G. Robert Thomas
C. B. Murdock
INVENTOR
Orlando C. Moore
BY Munn & Co.
ATTORNEYS

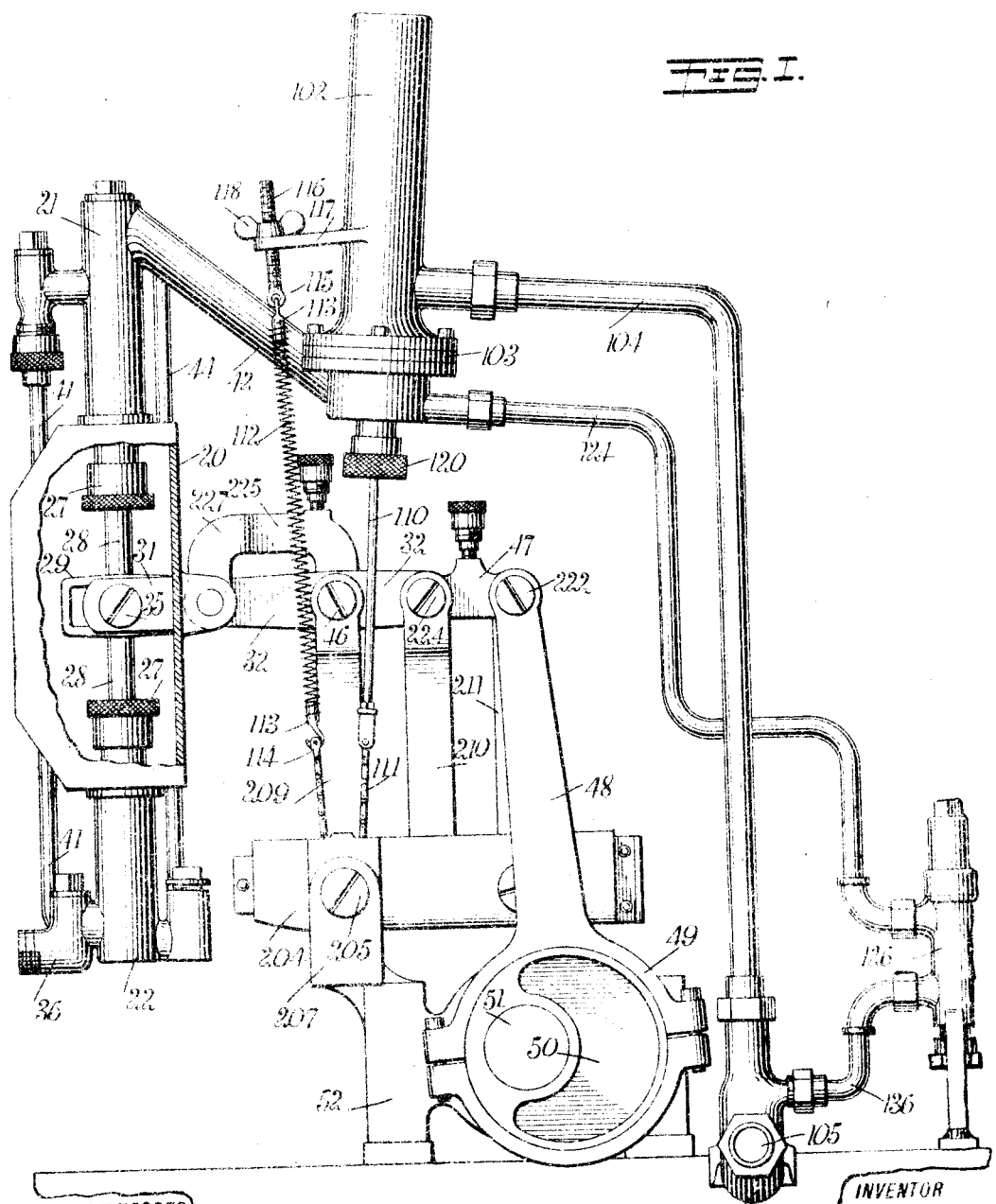

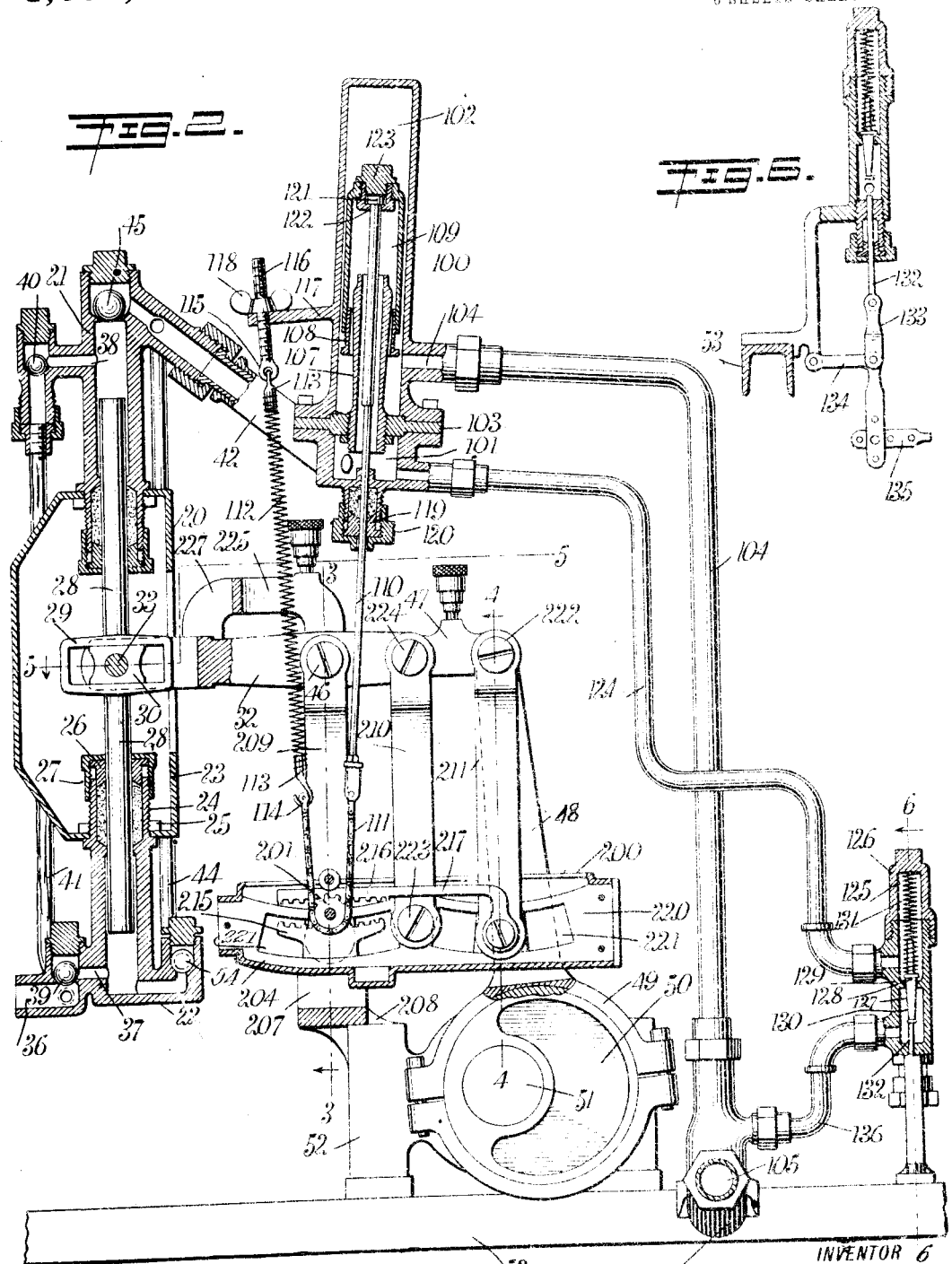

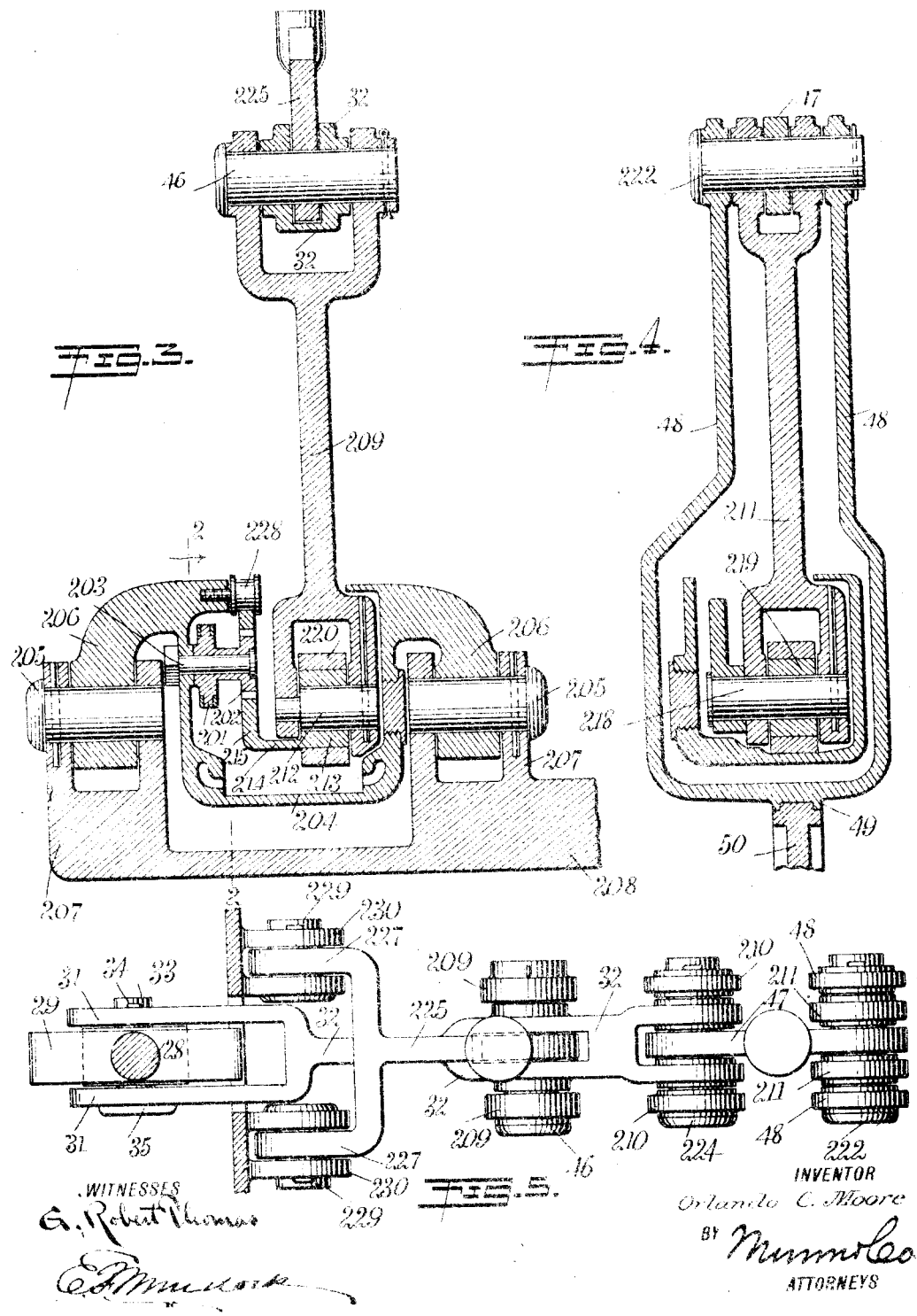

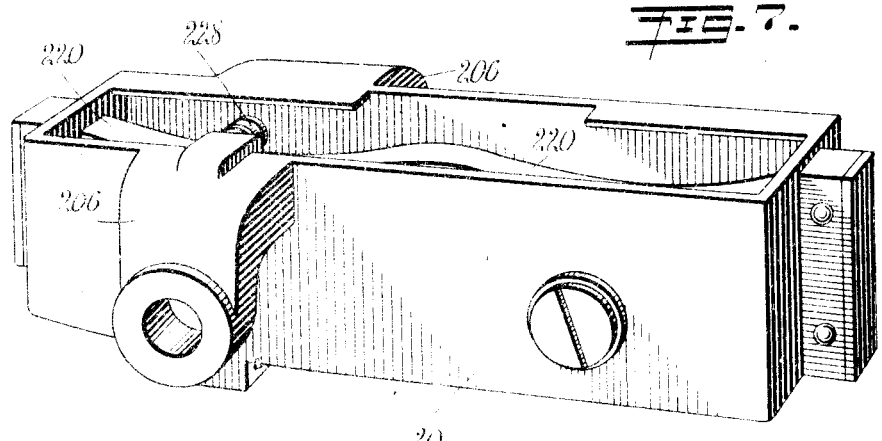
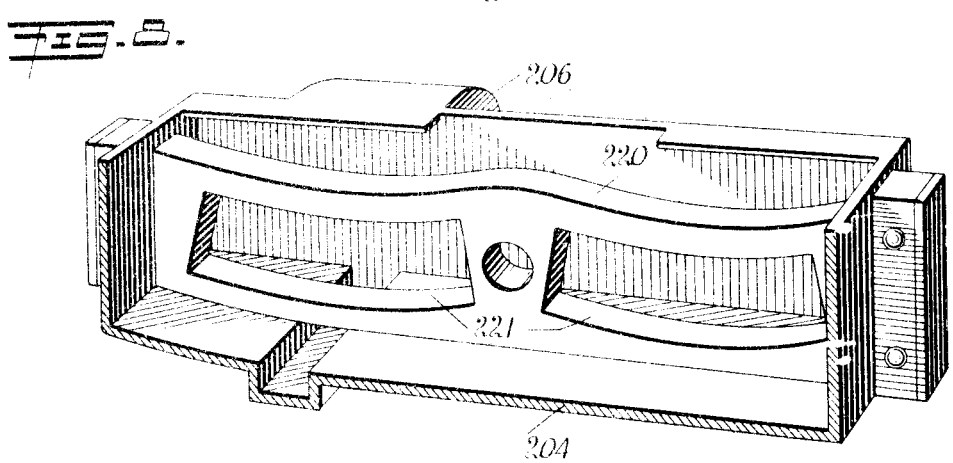
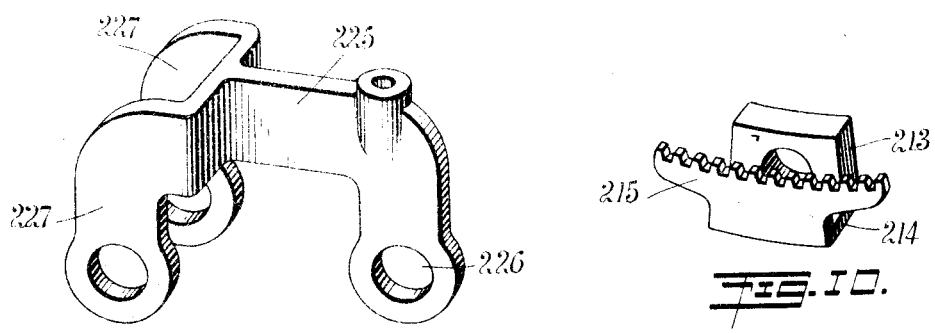

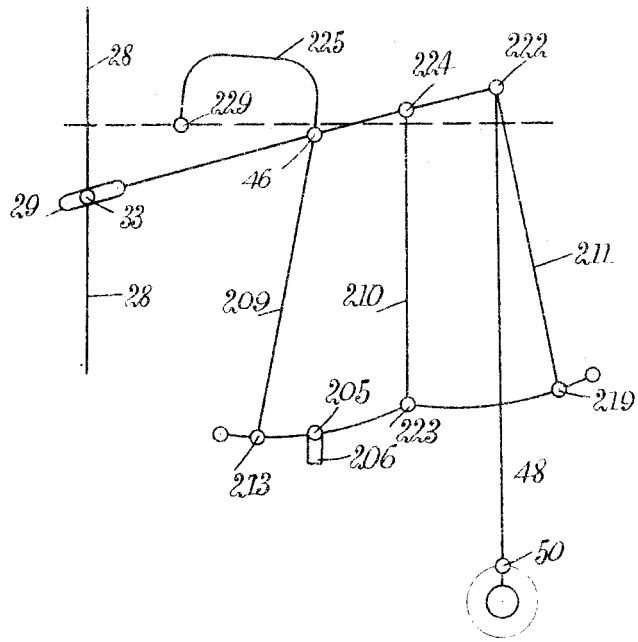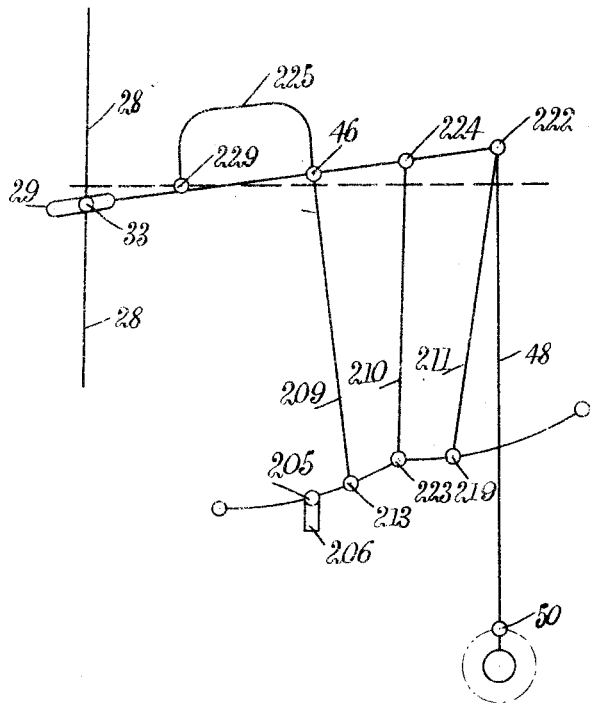

UNITED STATES PATENT OFFICE.

ORLANDO C. MOORE, OF MORROW, OHIO.

ENGINE-FEED-WATER REGULATOR.

1,050,745.

Specification of Letters Patent.

Patented Jan. 14, 1913.

Application filed March 26, 1912. Serial No. 686,233.

*To all whom it may concern:*

Be it known that I, ORLANDO C. MOORE, a citizen of the United States, and a resident of Morrow, in the county of Warren and State of Ohio, have invented a new and Improved Engine-Feed-Water Regulator, of which the following is a full, clear, and exact description.

The present invention relates to improvements in feed water and fuel control mechanism such as described in applications for patent filed by me in the United States Patent Office under date of December 24, 1910, and bearing Serial No. 599,175 and Serial No. 599,176, respectively, to which applications cross-reference is here made.

The present invention is distinguished over the previous art and the applications referred to, as having among its principal objects to provide simple and efficient means for regulating the length of stroke of a reciprocating pump connected with the water supply, to conform with the working conditions of engine and boiler; and to eliminate friction of the moving parts in the regulating mechanism.

One embodiment of the present invention is disclosed in the structure illustrated in the accompanying drawings forming part of this specification, in which like characters of reference denote corresponding parts in all the views, and in which—

Figure 1 is a side elevation of a feed water regulator constructed and arranged in accordance with the present invention; Fig. 2 is a vertical section taken on the median line of the structure shown in Fig. 1; Fig. 3 is a detail view, on an enlarged scale and in vertical section, taken on the line 3—3 in Fig. 2; Fig. 4 is a detail view in vertical section, taken on the line 4—4 in Fig. 2; Fig. 5 is a detail view, on an enlarged scale and in horizontal section, taken on the line 5—5 in Fig. 2; Fig. 6 is a detail view in cross section, taken on the line 6—6 in Fig. 2; Fig. 7 is a detail view in perspective of the link case employed in the present invention; Fig. 8 is a detail view of the link case shown in Fig. 7, the front side thereof being removed; Fig. 9 is a detail view in perspective showing the pivot hanger for the pump lever; Fig. 10 is a detail view in perspective of one of the roving pivot blocks with which the operating links are provided; Figs. 11 to 14 are diagrammatic views showing the variation in stroke of the pump rod from the operating position of the normal stroke to the operating positions of the augmented and diminished strokes.

To facilitate the description of the present invention, the various instrumentalities, shown in the drawings and herein described, are grouped as forming distinct and classified mechanisms, and to the more readily ascertain to which of the groups each instrumentality belongs, the designating numerals have been separated. Thus, the pump mechanism *per se* will be designated by the numeral 20, and the numerals from 21 up will be employed to designate the parts of the said pump mechanism; the flow mechanism will be designated generically by the numeral 100, and the numerals from 100 up will be used to designate the elements of the said flow mechanism; and the numeral 200 will be employed as the family designation of the elements forming the differential mechanism, while the numerals from 201 up will be employed to designate the instrumentalities forming the said differential mechanism.

*The pump mechanism.*—As seen in the drawings the pump mechanism consists primarily of two cylinders 21 and 22. Each cylinder is suitably mounted upon a casing 23. The casing 23 is structurally mounted upon the engine frame for which the regulating mechanism is intended. Each of the cylinders 21—22 is provided with a screw-threaded neck 24, the threads whereof register with threads provided in the supporting collars 25. The interior of the neck 24 is bored to form a housing for suitable packing which is compressed by a gland 26 and a compression screw cap 27 to override the same, the threads whereof register with the threads of the necks 24, as best seen in Fig. 2 of the drawings. Passing through the caps 27, glands 26 and suitable openings in the cylinders 21—22 are pump rams 28, 28. The rams 28 are each rigidly connected with a loop 29 having formed therein a rectangular opening for the slide block 30. The block 30 fills between the yoked ends 31, 31 of the pump lever 32 and is pivotally mounted upon the connecting pin 33. The pin 33 is secured in position on the ends 31 by a cotter pin 34 or other suitable device, the opposite end of the said pin being headed as at 35. The cylinders 21—22 are each supplied from the main 36 leading from the water supply. The inlet passages 37 and 38 are controlled by the ball valves 39 and 40, respectively. For convenience of structure the main 36 connected with the lower cylinder 22 is directly connected with the upper cylinder 21 by a branch pipe 41. The valves 39 and 40 prevent the back flow from the cylinders 22 and 21. The cylinder 21 delivers through the pipe 42 into the chamber 101 of the flow motor 100. The cylinder 22 delivers through the branch pipe 44 direct to the pipe 42, and to prevent the flow from the pipe 42 and the pipe 44 into the cylinder 21 the same is provided with a back check ball valve 45. The pipe 44 is provided with a check valve 54 to prevent backflow therein to the cylinder 22. The rams 28 are reciprocated by the lever 32, which lever is fulcrumed on the connecting pin 46. The free end of the lever 32 is pivotally connected by means of the link 47 with the bifurcated eccentric arm 48, the sides whereof are spread as shown in Fig. 4 of the drawings, being shaped in cross section to house a portion of the differential mechanism with which the regulator is provided. The eccentric arm 48 is furnished with a collar 49 suitably grooved, as seen in Fig. 4, to receive an annular extension formed on the rim of the eccentric 50. The eccentric 50 is mounted on the driving shaft 51 of the engine, which shaft in the present instance is suitably mounted in bearings formed in the standards 52 set up on the base plate or bed 53.

Under normal conditions, such as those depicted in Figs. 1, 2, 11 and 12, the strokes of the rams 28 are utilized to deliver a certain quantity of water to the chamber 101 coincident with and proportioned to the movement of the eccentric 50. It is by varying the stroke of the rams that the quantity of water delivered to the chamber 101 is varied. Under all conditions of stroke of the rams the operation of the said rams is timed to the rotation of the shaft 51 and the eccentric 50. To vary the length of the stroke of the rams 28, 28 and of the end of the lever 32 connected therewith in the present invention the connecting pin 46, constituting the fulcrum for the lever 32, is moved in a path substantially parallel with the path of the rams 28 and in conformity with or contrary to the direction of movement of the said rams. These movements of the pin 46 are resultant on the operation of what is herein termed the differential mechanism, the operation whereof is controlled by the mechanism styled the flow motor.

*The flow motor mechanism.*—The flow motor consists primarily of the cylinder 102, the interior compartment whereof is divided from the compartment 101 by a partition plate 103 and a flow controlling mechanism supported in part thereby. In the operation of the machine the water is passed from the compartment 101 to the compartment of the cylinder 102, and passed thence by the delivery pipe 104 to the feed pipe 105 having the check valve casing 106 corresponding in construction and function to that disclosed in one of the applications to which cross reference was above made. The flow of water from the compartment 101 to the cylinder 102 is determined by the nipple 107 and the sleeve 108. The nipple 107 is tapered, as best seen in Fig. 2, the smallest diameter being at the end of the nipple adjacent the partition plate 103 and the largest diameter being removed from the said plate. The center bore of the nipple 107 is cylindrical and of even diameter throughout. The sleeve 108 is provided with a cylindrical bore of an even diameter, the diameter of the sleeve being substantially equal to the largest diameter of the said nipple to substantially close the passage between the said nipple and the said sleeve when the sleeve is raised into juxtaposition with the enlarged portion of the said nipple. The sleeve 108 is adjustably mounted on a floating bell 109 contained within the chamber of the cylinder 102. The bell 109 is floated in the said cylinder 102 by the pressure of the water received through the nipple 107 and is lifted or depressed in the said cylinder as the pressure of the water within the bell 109 and the water in the cylinder 102 varies. The extent of the lift of the bell 109 is largely determined by the adjustment of the sleeve 108. The adjustment of the sleeve 108 is regulated by the screw thread engagement thereof with the bell 109. By manipulating the sleeve to secure the same within the bell 109 the inner edge of the said sleeve is drawn nearer or removed from the end of the bell 109, and the said edge is brought so much quicker into juxtaposition to the enlarged portion of the nipple 107, which, as remarked, substantially prevents the passage of water from the compartment 101 to the chamber of the cylinder 102.

The bell 109 in the present mechanism is utilized to rotate a sprocket wheel 201 of the differential mechanism with which it is connected by means of the pull rod 110 and the short length of sprocket chain 111. To counterbalance the lift of the water received from the pump 20 upon the bell 109 the end of the chain 111 opposite that connected with the rod 110 is engaged by a spiral spring 112. The spring 112 is engaged by means of the hooks 113, 113 to the eyelets 114 and 115, the latter being formed at the end of a screw bolt 116. The screw bolt 116 is threaded through the perforation formed in a bracket plate 117 extended from the cylinder 102 upon which rests the wing nut 118, the threads whereof register with the threads of the bolt 116. It will be understood that by the usual manipulation of the nut 118 the bolt 116 may be moved to increase or diminish the tension or pull of the spring 112, thereby increasing or diminishing in correspondence the pressure in the bell 109 necessary to lift the said bell and to rotate the sprocket wheel 201 in conformity with that action. The rod 110 is passed through a perforation in the structure formed on the compartment 101 and through the gland 119 and cap nut 120. Within the housing and gland is a suitable packing to prevent the leakage about the rod 110 from the compartment 101. The upper end of the rod 110 is provided with a head 121 seated as shown in Fig. 2 within an internal screw cap 122. To prevent the lift of the rod 110 independent of the bell 109, a cap nut 123 is screwed into the cap 122. When thus constructed and arranged, the rod 110 is firmly secured to the bell 109, and is compelled to move therewith.

The operation of the flow motor mechanism is controlled by a valve 129, which is operatively mounted in a seat formed in the partition 128 of a cylinder 126, which partition divides said cylinder into an upper and a lower chamber 125 and 127, respectively. The valve is normally seated by a spiral spring 131. It is lifted from its seat by the plunger rod 132. The rod 132 is operatively connected by the throttle lever of the engine to which the present regulator is connected. The plunger rod 132 is connected with the said throttle lever by a link 133, a lever 134 and a connecting rod 135, as best seen in Fig. 6 of drawings, and as fully set forth in the application 599,175 above referred to. The upper chamber 125 is connected by a pipe 124 with the chamber 101 of the flow motor 100. The lower chamber 127 is connected with the pipe 105, as seen best in Fig. 2 of drawings. The valve 129 is provided with a stem 130, which is gradually tapered from the valve 129, downward to extend within the chamber 127. The stem 130 is thus shaped to the end that, as the valve and stem connected therewith are lifted by the operation of the rod 132, the passage in the partition 128 is gradually enlarged, and this proportionate to the operation of the steam throttle above referred to. It will be understood that by reason of the above-mentioned connection between the valve 129, the stem 130 and the steam throttle of the engine, the flow of the water through the pipes 124 and 105 is proportioned to the steam consumption of the engine under normal conditions. The operation of the flow motor 100 upon the differential mechanism controls the operation of the pump mechanism, to compensate for an excessive or diminished supply of water from the pump 20. Under ordinary conditions, the operation of the driving shaft 51 is proportioned to the required flow of water for conversion into steam in the boiler of the engine for which the present regulator is designed. When, however, the speed of the shaft 51 is accelerated while the steam consumption is maintained constant or diminished, as, for instance, during the period of coasting, the operation of the pump is in excess of the demands of the boiler. When, on the other hand, the engine is being employed in hill-climbing, the speed of the shaft is lessened while the steam consumption is increased. During the period of coasting, the steam throttle is partially or entirely closed, while the speed of the shaft 51 is accelerated. During the operation of hill-climbing, the steam throttle is thrown wide open, while the speed of the shaft 51 is diminished by the traction load. In both instances, it is provided by the employment of differential mechanism, that the supply of water delivered through the pipe 105 is varied to meet the exigency of the particular case. When in the former of the instances above mentioned, the delivery of water from the pump 20 to the boiler is excessive, the partial or entire closure of the valve 127 effects a congestion in the chamber 101, which, by overbalancing the pressure of water in the chamber 102, lifts the bell 109 of the flow motor 100 to shorten the stroke of the pump through the intermediary of the differential mechanism. Under the conditions outlined in the second of the above-mentioned instances, the delivery of water from the pump 20 is insufficient; the chamber 101 is drained through the cylinder 126, and the pressure in the chamber 101 is reduced below the pressure in the chamber 102, which unbalance moves the bell 109 and parts connected therewith, to operate the differential mechanism to increase the stroke of the pump 20, thus supplying the deficiency.

*The differential mechanism.*—The differential mechanism 200 is operatively connected with the flow motor mechanism 100 by the sprocket wheel 201. The sprocket wheel 201, as best seen in Fig. 3 of the drawings, is integrally formed with a cog wheel 202, the said wheels being spaced apart and rotatably mounted on a bolt 203. The bolt 203 is rigidly secured in the side of a cradle 204. The cradle 204 is pivotally mounted upon pins 205, 205, the said cradle being provided with bearings formed in brackets 206, 206. The brackets 206 and bearings formed therein are disposed adjacent one end of the cradle 204. The pins 205 supporting the cradle are fixedly mounted in bifurcated arms 207, 207 erected upon a bracket 208 extended from the standard 52 supporting the bearing for the driving shaft 51. The cradle 204 is supported by the link bars 209, 210 and 211. The bar 209, as seen in Fig. 3 of the drawings, is pivotally connected to the pin 46 on the lever 32 and by the pin 212 to the sliding block 213. The sliding block 213 is integrally provided with a bracket 214 upon which is erected a rack segment 215. It is with the rack segment 215 that on the lower side thereof the wheel 202 engages. The wheel 202 is engaged on the opposite side thereof with the rack 216 formed at the end of a link bar 217. The bar 217 is pivotally connected with a pin 218 which unites the bar 211 and block 219. By reason of this connection of the rack segment 215 and the rack 216 with the ends of the bars 209 and 211 respectively and with the cog wheel 202 mutually, the rotation of the said cog wheel 202 effects the mutual separation and approximation of the said blocks and the ends of the bars 209 and 211 connected therewith. The bar 217 is maintained in engagement with the wheel 202 by means of a roller 228. The blocks 213 and 219 are mounted in a link plate 220, the said plate being provided equidistant from the center thereof with curved open slots 221, 221. The curves of the slots 221 are each struck from the center of the pins 46 and 222. The bar 210 is pivotally connected by a pin 223 with the plate 220 and between the slots 221 thereof. The said bar 210 is similarly connected by a pin 224 with the lever 32 and the link 47. The bar 210 serves to maintain the relation of the lever 32 and the cradle 204.

With a differential mechanism thus constructed the operation is as follows:—In the normal arrangement the bars 209, 210 and 211 are disposed substantially as shown in Figs. 2, 3, 11 and 12 of the drawings. It will be noted in this position that the pin 212 is concentric with the pins 205 and that as the cradle 204 is rocked by the operation of the eccentric 50 the pin 46, which forms the fulcrum for the lever 32, is maintained constant. It is in this position that the pump is operating under what may be termed its normal conditions. If now the pressure of water in the bell 109 be increased for any of the reasons above recited over the pressure of the water in the chamber of the cylinder 102, with the consequent result that the said bell is lifted, the sprocket wheel 201 and cog wheel 202 connected therewith are rotated the reverse of clockwise. By observing the drawings it will be seen that the racks 215 and 216 are moved to the right and left respectively, carrying the blocks 213 and 219 toward the median line of the plate 220, as seen in Fig. 14 of the drawings. This moves the block 213 with the pin 212 on the side of the axis of the pivot pins 205 coincident with the block 219. When now the cradle is lifted by the bar 211 the bar 209 is lifted, raising coincidently the pin 46, this being permitted by the hanger 225 which is pivotally connected by the eyelet 226 with the pin 46 and by the eyelets in the arms 227 with the frame of the pump 20, by means of the pins 229 extended through the hinge wings 230. In the fall of the bar 211 the pin 46 is carried below the normal position for said pin. This operation of the pin in the same direction with the bore in the lever 32 results in a diminished stroke of the lever 32 on the rams 28. The operation is equivalent to that which would be caused by moving the fulcrum of the lever 32 toward the pin 33.

If following the action previously described the pressure of water below the bell 109 be lessened to permit the spring 112 to retract the bell and to reverse the rotation of the wheels 201 and 202, the racks 215 and 216 and the sliding blocks connected therewith are moved in a direction opposite to that just described, as seen best in Fig. 13 of the drawings, with the effect that the pin 212 is carried past the axis of the pivot pins 205. In this position it will be seen that coincident with the rise of the bar 211 is a depression of the bar 209. The pin 46 being thus depressed coincidently with the rise of the pin 222, or point of power application to the lever 32, the stroke of the end of the lever 32 is augmented. It will be understood that in the operation of the mechanism above described balance of pressure of water in the bell 109 and the chamber of the cylinder 102 is established under normal working conditions, this being effected by increasing or relieving the stress of the spring 112 by manipulating the nut 118. Having established this normal condition the subsequent operation of the mechanism is automatic. It will be remembered that in the operation of the feed mechanism under the emergency condition where the water is by-passed from the chamber 101 through the pipe 124 and cylinder 126, the flow of water through the cylinder 102 and pipe 104 is moved to its fullest capacity, but this operation also affects the differential mechanism just above described in that by the lowering of the bell 109 to increase the flow through the cylinder 102 the sliding blocks 213 and 219 have been moved to increase to the maximum the stroke of the lever 32 and rams 28 connected therewith.

Having thus described my invention, I claim as new and desire to secure by Letters Patent:—

1. An engine feed water regulator such as described, having a pump, a flow motor affected thereby, and a differential mechanism, comprising a lever operatively connected with the moving member of said pump; a movable pivot for said lever; a rocking member having a definite pivot; means operatively connecting the free end of said lever and said rocking member; a connector for said movable pivot and said rocking member; and means operable by said flow motor to vary the disposition of said connector in said rocking member.

2. An engine feed water regulator such as described, having a pump, a flow motor affected thereby, and a differential mechanism, comprising a lever operatively connected with the moving member of said pump; a movable pivot for said lever; a rocking member having a definite pivot; means operatively connecting the free end of said lever and said rocking member; a connector for said movable pivot and said rocking member; and means operable by said flow motor to vary the disposition of said connector in said rocking member, to dispose same successively on both sides of the pivot of said rocking member.

3. An engine feed water regulator such as described, having a pump, a flow motor affected thereby, and a differential mechanism, comprising a lever operatively connected with the moving member of said pump; a movable pivot for said lever; a rocking member having a definite pivot; means operatively connecting the free end of said lever and said rocking member; a connector for said movable pivot and said rocking member; means operable by said flow motor to vary the disposition of said connector in said rocking member, and power-driven means for reciprocating the free end of said lever.

4. In an engine feed water regulator such as described; a pump; a rocking lever operatively connected with said pump; power-driven means for reciprocating the free end of said lever; a movable pivot for said lever; power-driven means for reciprocating said pivot synchronously with the free end of said lever; and means for varying the extent and direction of reciprocation of said pivot.

5. In an engine feed water regulator such as described; a pump; a rocking lever operatively connected with said pump; power-driven means for reciprocating the free end of said lever; a movable pivot for said lever; power-driven means for reciprocating said pivot synchronously with the free end of said lever; and a pressure-actuated flow motor operatively connected with said second-mentioned power-driven means, to vary the extent and direction of reciprocation of said pivot in conformity with the balance of pressure of water delivered by said pump into said flow motor.

6. An engine feed water regulator such as described, having a reciprocating plunger pump; a flow motor interposed on the delivery pipe of said pump and having therein a floating member moved by the variation of water pressures in said motor; a rocking arm operatively connected with the plunger of said pump; a rocking member having a fixed pivot; links operatively connecting said lever and said rocking member, one of said links being pivotally connected to said rocking arm and rocking member in definite arrangement, and the other of said links being definitely connected with said rocking arm and having a roving connection with said rocking member, said roving connection being adapted to move to both sides of the pivot of said rocking member; means operatively connecting said floating member of said flow motor and the roving connection of said other of said links; and power-driven means for rocking said rocking member.

7. An engine feed water regulator such as described, having a reciprocating pump; a rocking lever for operating said pump; a member floated by the water delivered from said pump; a power-driven rocking member; a plurality of links connecting said rocking member and said lever, one of said links being definitely pivoted to said lever and to said rocking member, the other of said links being definitely pivoted at one end, the other end being free to move lengthwise said lever or said rocking member, to vary the length of the power stroke of said lever; and means operatively connecting said floated member and said second-mentioned link to shift the movable end of said link.

8. An engine feed water regulator such as described, having a pump lever; a rocking member disposed approximately parallel said lever and definitely pivoted intermediate the ends thereof; a connecting link definitely pivoted upon said rocking member intermediate the ends and removed from the pivot thereof, said link being pivotally connected with the free end of said lever; a fulcrum link pivotally connected with said lever intermediate the ends thereof, to form a fulcrum therefor, said fulcrum link being movably connected with said rocking member and adapted to register with the pivot of said member; means actuated by pressure of the feed water to shift the movable end of said fulcrum link in a path extended at both sides of the pivot of said rocking member; and power-driven means connected with the engine for rocking said rocking member.

9. An engine feed water regulator such as described, having a pump lever; a rocking member disposed approximately parallel said lever and definitely pivoted intermediate the ends thereof; a connecting link definitely pivoted upon said rocking member intermediate the ends and removed from the pivot thereof, said link being pivotally connected with the free end of said lever; a fulcrum link pivotally connected with said lever, intermediate the ends thereof, to form a fulcrum therefor, said fulcrum link being movably connected with said rocking member and adapted to register with the pivot of said member; means actuated by pressure of the feed water to shift the movable end of said fulcrum link in a path extended at both sides of the pivot of said rocking member; a power transmission link definitely pivoted to power-driven means and movably mounted in said rocking member, adjacent the end opposite that connected with said fulcrum link; and means operatively connecting said fulcrum link and transmission link to move the free ends thereof in harmony.

10. An engine feed water regulator such as described, having a pump lever; a rocking member disposed approximately parallel said lever and definitely pivoted intermediate the ends thereof; a connecting link definitely pivoted upon said rocking member intermediate the ends and removed from the pivot thereof, said link being pivotally connected with the free end of said lever; a fulcrum link pivotally connected with said lever, intermediate the ends thereof, to form a fulcrum therefor, said fulcrum link being movably connected with said rocking member and adapted to register with the pivot of said member; means actuated by pressure of the feed water to shift the movable end of said fulcrum link in a path extended at both sides of the pivot of said rocking member; a power transmission link definitely pivoted to power-driven means and movably mounted in said rocking member, adjacent the end opposite that connected with said fulcrum link; and connecting operative means for moving the free ends of said fulcrum and transmission links successively toward and away from each other.

In testimony whereof I have signed my name to this specification in the presence of two subscribing witnesses.

ORLANDO C. MOORE.

Witnesses:
 LEONARD MOUNTS,
 ERNEST P. LOEHER.